March 25, 1952 N. G. OTIS 2,590,722
WHEEL ALIGNING DEVICE
Filed Oct. 30, 1948 2 SHEETS—SHEET 1
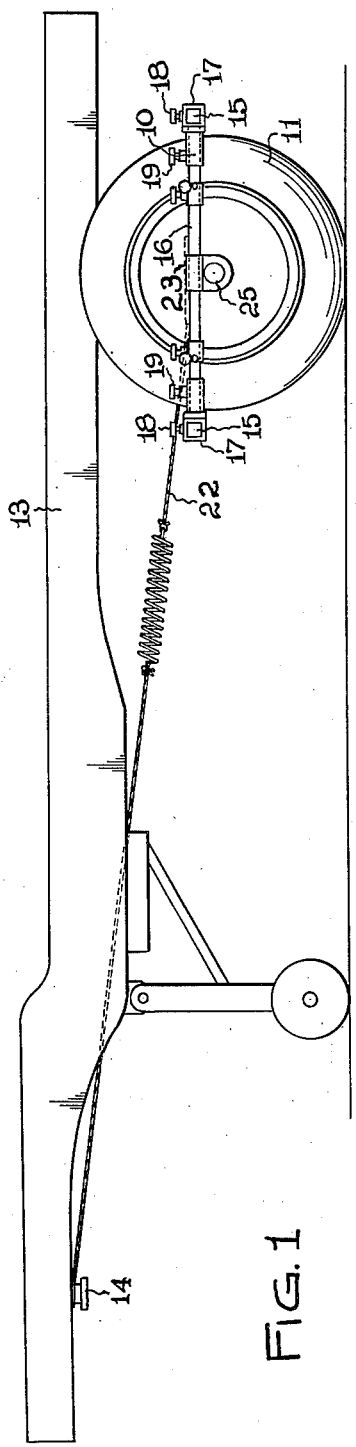
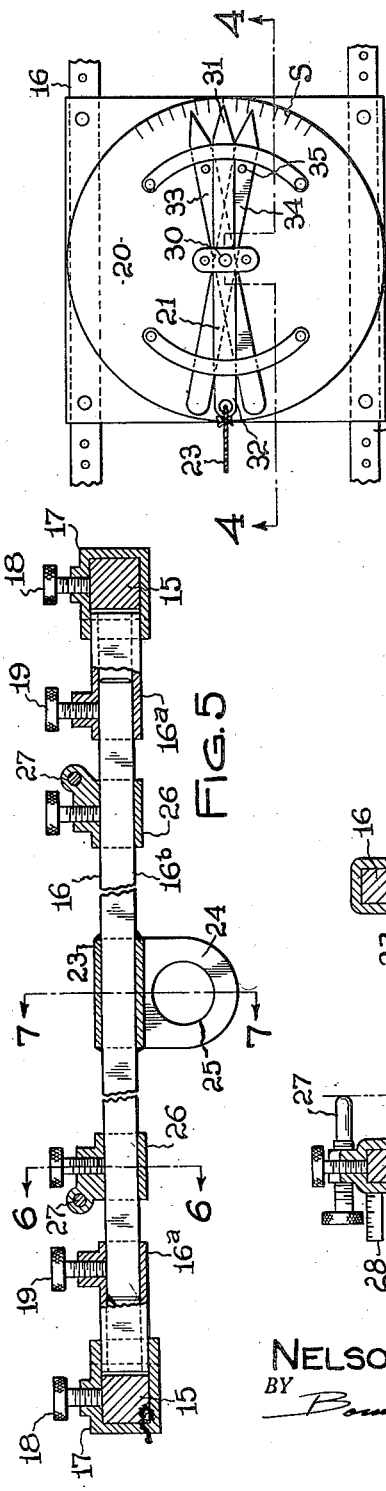
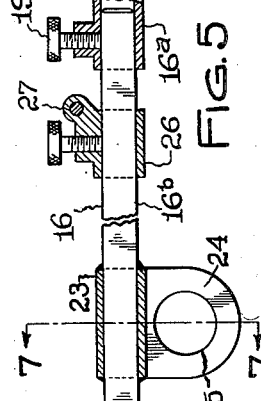
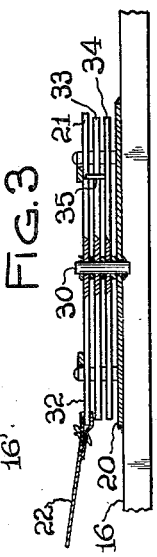
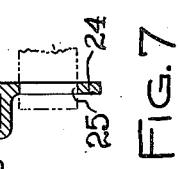
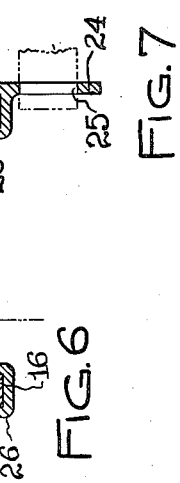
INVENTOR.
NELSON G. OTIS
BY
ATTORNEYS.

March 25, 1952  N. G. OTIS  2,590,722
WHEEL ALIGNING DEVICE
Filed Oct. 30, 1948  2 SHEETS—SHEET 2
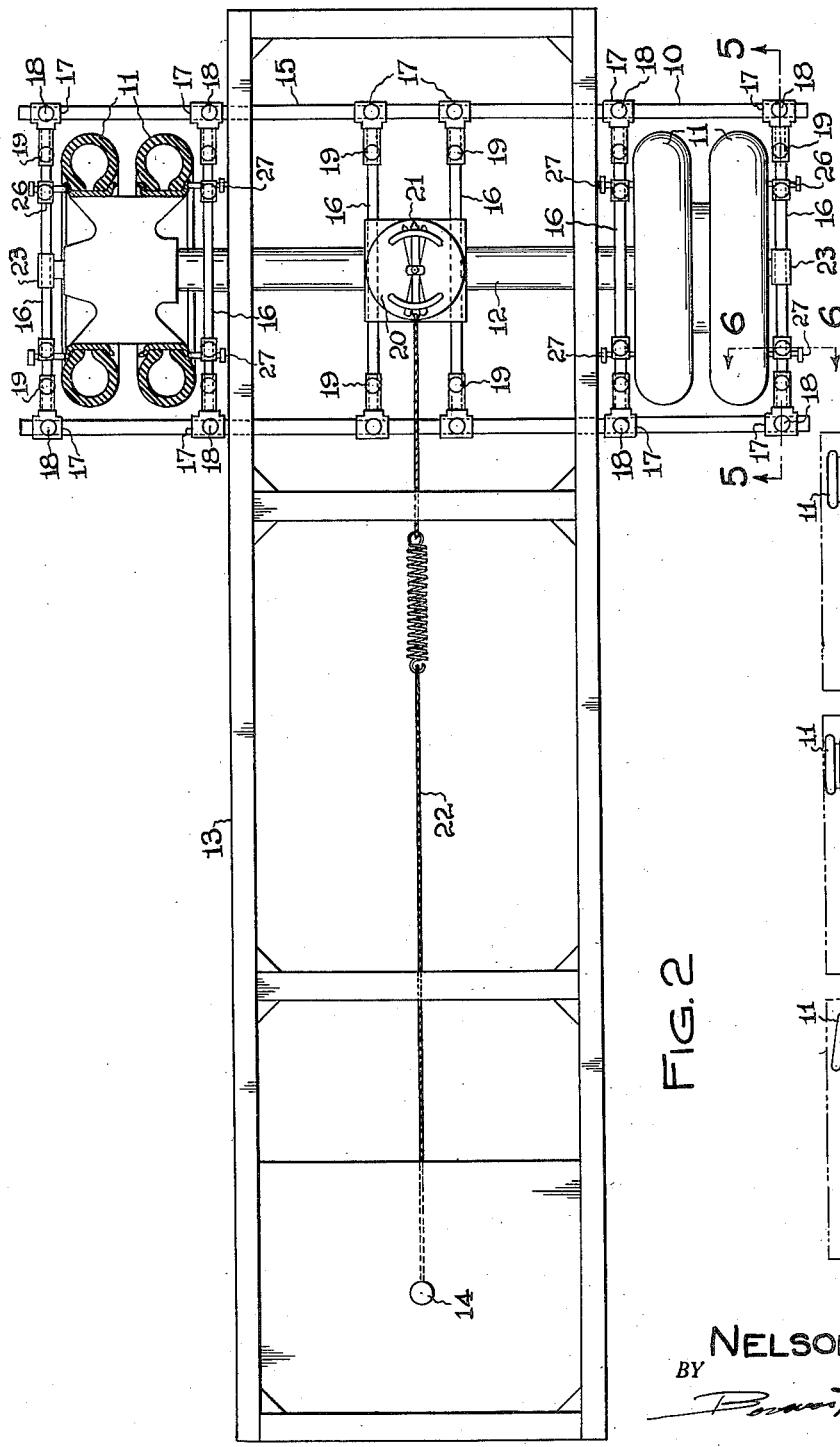
INVENTOR.
NELSON G. OTIS
BY
ATTORNEYS.

Patented Mar. 25, 1952

2,590,722

UNITED STATES PATENT OFFICE 2,590,722

WHEEL ALIGNING DEVICE

Nelson G. Otis, Bay Village, Ohio, assignor to Helen M. Warner, Olmstead Falls, Ohio Application October 30, 1948, Serial No. 57,513

7 Claims. (Cl. 33—203.2)

This invention relates to wheel aligning devices and more particularly to devices for aligning the wheels and axles of a vehicle in relation to the line of draft of the vehicle.

A problem to which my invention is addressed comprises two parts, the first is concerned with an improved method of aligning the wheels of a vehicle with respect to their supporting axle and to each other, the second is concerned with aligning the wheels and axle with respect to the direction of travel or line of draft of the vehicle. Proper alignment in each of these respects produces advantageous results in the form of reduced power consumption, even braking, and particularly in longer tire life.

A general object of my invention therefore is to provide an improved portable aligning frame for aligning the wheels of a vehicle relative to each other and to their axles and to determine the trueness and straightness of the axles and as well to determine and to align correctly the wheels of a vehicle in relation to the line of traction of the vehicle.

More specifically it is an object of my invention to provide means for determining the alignment of the wheels of a vehicle with regard to a point of reference lying on the line of draft of the vehicle such as the coupling pin of a semi-trailer or like reference points depending on the vehicle.

Another object is to provide means for measuring the trueness of a vehicle frame and its supported axles and the deviation if any from the line of draft.

Another object is to provide wheel alignment means comprising a gauging frame mounted adjacent the wheels and an axle of a vehicle and a dial means carried by said frame and connected to the vehicle to indicate the alignment of said wheels and axle with relation to the line of draft of said vehicle.

Another object is to provide a portable wheel aligning device which is light in weight and which may be easily mounted on a vehicle for convenient use.

Another object is to provide a strong, rigid, and accurate frame for measuring the alignment of vehicle wheels and which is adjustable to accommodate various sizes of wheels and axle lengths.

Another object is to provide wheel alignment apparatus which is cheap and easy to manufacture, and which can be readily assembled and disassembled.

Other objects and advantages will more fully appear from the following description of my invention, reference being had to the accompanying drawings in which Figure 1 is a side elevation of my invention shown mounted on a semi-trailer frame, Figure 2 is a plan view of the assembly of Figure 1, Figure 3 is a plan view of the dial and connecting means of Figure 1 on an enlarged scale, Figure 4 is a sectional view of the dial means of Figure 3 taken in the plane 4—4 of Figure 3, Figure 5 is a sectional view taken in the plane 5—5 of Figure 2, Figure 6 is a sectional view of a wheel gauging screw device, Figure 7 is a longitudinal section of the axle engaging bracket, and Figures 8, 9 and 10 are respectively diagrammatic views showing two forms of misalignment in contrast with ideal wheel alignment.

A preferred form of my invention is illustrated herein for use with a semi-trailer although it is to be understood that this is illustrative only and that my invention can advantageously be used to check the wheel alignment of other vehicles as well.

Briefly my invention comprises an assembled gauging frame 10 adapted to be disposed closely adjacent the wheels 11 and rear axle 12 of a semi-trailer of which only the body frame 13 and king pin 14 is shown. The frame preferably is mounted on the ends of the axle 12 and provides an improved gauge against which the parallelism of the wheels 11 and the perpendicularity of their mounting on the axle 12 can be compared and measured. Additional means comprising an indicating dial 20 are mounted on the frame and connected to the king pin of the trailer by a connection 22 in a manner which enables the relationship of the wheels and axle to the line of draft of the trailer to be determined. This enables the detection of various forms of misalignment which cannot be measured by the use of the frame 10 alone.

The frame 10 is essentially a large, adjustable gauge suitable for measuring the alignment of the wheels 11 and is of a construction which assures rigidity and accuracy. The frame 10 has strong, rigid, longitudinal rails 15 adapted to lie parallel to the axle 12 when the frame is in operative measuring position. The rails 15 are connected by cross members or arms 16 extending at right angles thereto and adapted to lie generally parallel to and closely adjacent the wheels of the trailer. Preferably the side rails 15 and cross members 16 are square and solid in section, as shown, although they may be of tubular construction and may have any sectional shape having the required structural strength. The cross members 16 are connected to the rails 15 by right angled T-fittings 17, secured to the ends of the cross members 16 as by press fit and having close sliding fit with the rails 15, see Figure 5. Set screws 18 extend through the T-fittings 17 and bear against the rails 15 to lock the cross members 16 in the desired positions along the rails. By this mounting the cross members can be adjusted to take any desired position along the side rails while remaining perpendicular thereto and parallel with each other. Preferably also the side rails 15 or one of them are marked with a graduated scale so that the positions of the cross members can be determined accurately.

Ordinarily the cross members 16 are of such a length as to enable the frame to fit the wheels and tires of most vehicles but in order to make the frame more universal in fit, each of the cross members 16 may be telescopically extensible comprising, as shown in Figure 5, outer sleeve portions 16a and an inner sleeve portion 16b secured together by set screws 19 to form the desired cross member length.

The frame 10 is secured in its operative measuring position to the ends of axle 12 by means of a pair of brackets 23 secured respectively to each of the exterior cross members 16 at their midpoints and fitting onto and over the ends of the axle 12 as shown in Figure 1. The form of these brackets may vary with the wheel and axle mounting encountered but preferably it should center the frame 10 with respect to the axle. A convenient form of bracket is shown in section in Figure 7 to consist essentially of a depending plate 24 having a hole 25 to receive closely the adjacent end of axle 12. An alternate form of bracket may have a pointed screw extending through the plate of the bracket and adapted to be inserted into the centering hole at the end of the axle which is always present from the machining operations. To insure accuracy of centering, the exterior cross members 16 which support the brackets may also be provided with graduations similar to those on rails 15.

In use the frame 10 is positioned about the wheels and axle of a semi-trailer as shown in Figures 1 and 2 with the plate of the frame close to and slightly above the axle. Preferably the frame is hung close to the axle. The end rails 16 adjacent the wheels 11 and on each side thereof are moved along rails 15 to lie closely adjacent the wheels 11 and the trueness of the wheel alignment is tested by means of members 26, see Figure 6, carried by the cross-arms 16 and having micrometer screws 27 which are adapted to be screwed into contact with the rims of the wheels as best shown in the upper portion of Figure 2. The distances the screws 27 are turned in before abutting the wheels may be measured directly, or preferably a scale 28 integral with each of the members 26 may lie adjacent the path of travel of the head of the screw 27 to facilitate such measurement. In such case the position of the head of a screw will be checked against its scale 28 to determine the distance of travel. If the wheels are truly perpendicular to the axle and the axle is straight the screws 27 on each cross-arm will be screwed in to make contact with the rims by the same amount on each side of the axle. On the other hand if the axle is bent or if the wheels are otherwise misaligned, the set screws 27 will so indicate for they will be turned in unequal distances before coming into contact with the rims. When misalignment exists it may be necessary to test the wheels for several angular positions of wheel rotation in order to fully determine the extent of misalignment.

Several conditions of misalignment may occur, however, which cannot ordinarily be detected and measured by use of the frame 10 and micrometer screws 27 alone. As examples two of these conditions are illustrated diagrammatically in Figures 8 and 9 respectively. In each of these examples the wheels and axle are misaligned relative to the line of traction and such misalignment cannot be detected by use of frame 10 alone. For example, the body of a vehicle may be warped so that the rear wheels and axle are displaced laterally to one side as shown in a somewhat exaggerated scale in Figure 9, or the body may be twisted so that the rear axle takes an angular position relative to the normal position, see Figure 8.

To determine the relationship of the wheels and axle to the line of draft of the trailer and in order to detect and measure the types of misalignment shown in Figures 8 and 9 additional apparatus is provided, including a dial 20 mounted in the center of the frame 10 and carried by two centrally located cross arms 16, see Figures 2 and 3. The dial is preferably located midway of the wheels 11 and the ends of axle 12, and midway of the supporting arms 16, such position being determined with the help of the graduated scales on the rails 15 and 16 previously mentioned. A pointer 21 is freely pivoted about a pivot point 30 in the center of the dial and has a pointed end 31 adapted to indicate angular variations on a graduated scale S of the dial. The scale preferably has its zero point so located that the pointer 21 will point to it when the pointer is at right angles to the axle 12 of the trailer. The other end 32 of the dial pointer 21 is connected to the king pin 14 of the semi-trailer by connection 22. The connection comprises a flexible linkage so that it may be pulled taut and preferably, though not necessarily, it may be made resilient by the insertion of a spring as shown in Figure 1. Since the pointer is free to pivot about the point 30 it becomes in effect an extension of the flexible connection 22 when it is pulled taut. If the axle 12 and wheels 11 are properly aligned with relation to pin 14 the connection 22 will extend at right angles to axle 12 and will bisect the axle 12. The pointer in such case will indicate zero. Figure 10, which is a diagrammatic representation of Figure 2, indicates this condition of true alignment for comparison with Figures 8 and 9. As shown in Figures 2 and 10 the line of traction for the trailer is a longitudinal center line passing through pin 14 and forming a perpendicular bisector of axle 12. The dial 20 is also centrally located with the pivot point 30 falling on the line of traction. The taut flexible connection between pin 14 and the pointer 21 pulls the pointer 21 onto the line of traction and the pointer accordingly points to zero when alignment is correct. With such condition the traction forces on wheels 11 are balanced and the semi-trailer wheels are aligned for best rolling operation.

If the wheels and axle should be laterally displaced to the right as shown in Figure 9 the dial 20 and its pivot point 30 will likewise be laterally displaced. The connection 22 and pointer 21 will no longer be perpendicular to the axle, but instead will extend at an angle to the axle as shown in Figure 9. The pointer will be deflected to one side of the zero point to indicate a reading whose value indicates the amount of lateral displacement.

If the axle should be misaligned angularly then the pointer 21 will again indicate the degree of misalignment for although the pivot 30 remains in the same place, the dial 20 will be rotated through the angle of misalignment as will be easily seen in Figure 8. The pointer will again be deflected to one side of zero. It is of course understood that in each of these examples it is assumed that the axle is straight and the wheels are correctly mounted with respect to the axle.

To indicate the extremes of movement of pointer 21, the dial is provided with a pair of bumper pointers 33 and 34 respectively, also pivoted at 30 and having pins 35 to be contacted by the pointer 21 to move the bumper pointers with pointer 21 upon outward swinging movement of pointer 21 away from zero position. The bumper pointers are frictionally mounted and held against accidental displacement by constructions that are well-known.

To mount the unit on the trailer, the frame is partially disassembled and then reassembled about the trailer. This is most conveniently done by loosening the screws 18 on one side so that a rail 15 may be drawn free of the frame. The frame is then placed adjacent the wheels with the members 16 embracing the wheels and the brackets 23 engaging the ends of the axle. Since the members 16 are longitudinally adjustable along the rails 15, any adjustment required may be readily accomplished. The rail 15 is then reinserted and the set screws 18 are tightened to hold it in place. The frame may take the position shown in Figures 2 and 3 positioned over the axle but in some cases it may be more convenient to hang it below the axle. Once in position the micrometer screws 27 are turned into contact with the wheels to test their alignment in the manner previously described. Once the trueness of the wheels and axle has been satisfactorily determined the alignment relative to the line of draft is tested. The position of the dial 20 is first checked to make sure that it lies over the axle and that the pivot point 30 lies on the perpendicular bisector of the axle. The graduations on the rails 15 and the members 16 facilitate and insure this positioning of the dial. Then the connection 22 is made between the dial 20 and the king pin 14. If the dial pointer indicates zero the wheels and axle are correctly aligned. If misalignment occurs the pointer will not indicate zero. Ordinarily, the type of misalignment, that is whether of lateral displacement as indicated in Figure 9 or of angular misalignment as in Figure 8, can be determined by inspection. If such is not possible then the kind of misalignment can be determined by comparing the angular relation of the frame 10 and the vehicle framework. In any case, the extent of misalignment may be measured by moving the dial 20 and its supporting members 16 laterally along the rails 15 while watching the pointer 21. Such motion of the dial will cause the pointer to return to zero. This dial motion is the measure of the extent of misalignment.

In positioning the dial 20 upon the frame 10 it is desirable to have pivot point 30 located over the axle 12 and on the line of traction which normally is the perpendicular bisector of axle 12. Then as described above pointer 21 will point to zero when the wheels and axle are correctly aligned with king pin 14. In some cases the point of reference may not be clearly accessible for connection to pointer 21. In such cases the dial may be displaced upon the frame by a known amount and the pointer readings corrected accordingly. Likewise the connection may be made not to the ideal reference point but to a point displaced by a known amount from that point and the readings corrected in a similar fashion.

In order to test alignment thoroughly the frame and associated dial mechanism can remain mounted on the trailer and alignment checked while the trailer is pulled forwardly.

The herein disclosed alignment testing device can be used with other vehicles with little or no adjustment required. Generally speaking the flexibility and resiliency of connection 22 will enable adaptation to other trailers of the same type with no change required, and from this standpoint a connection comprising a flexible and resilient linkage is advantageous. When used with automobiles the point of reference may be any point in the line of draft and the frame 10 may then conveniently be suspended adjacent the wheels and below the axle.

Other forms and modifications of my invention will be apparent to those skilled in the art without departing from the spirit and scope of my invention and I do not care to be limited in any way other than by the following claims.

I claim:

1. Apparatus for measuring the wheel alignment of a vehicle comprising a generally rectangular gauging frame, said frame encompassing two oppositely facing wheels and the interconnecting axle of said vehicle and being mounted on said axle, and, connected both to said frame and to said vehicle, dial-and-pointer means for indicating the alignment of said axle with respect to the line of draft of said vehicle.

2. Apparatus according to claim 1 in which said frame includes cross members moveable toward and from each other in a direction transverse to the line of draft.

3. Apparatus according to claim 2 in which the cross members are provided with measuring screws where they adjoin the outside faces of the wheels.

4. Apparatus according to claim 3 in which scales are mounted on the cross members in juxtaposition to the measuring screws.

5. Apparatus for measuring the wheel alignment of a vehicle comprising a gauging frame mounted closely adjacent the wheels and axle of said vehicle and mounted on said axle for indicating the alignment of said wheels with respect to said axle and to each other and means mounted on said frame and connected to said vehicle for indicating the alignment of said axle with respect to the line of draft of said vehicle comprising a dial having an indicating scale and a pointer pivoted to swing freely on said dial, said pointer being connected by a flexible connection to a point on said vehicle located accurately with respect to the line of draft of said vehicle.

6. Apparatus according to claim 5 in which said connection is resilient.

7. Apparatus according to claim 6 in which said connection includes a spring.

NELSON G. OTIS.

REFERENCES CITED

The following references are of record in the file of this patent:

UNITED STATES PATENTS

| Number | Name | Date |
|---|---|---|
| 375,590 | Wilson | Dec. 27, 1887 |
| 1,749,268 | Taylor | Mar. 4, 1930 |
| 1,782,827 | Lahr | Nov. 25, 1930 |
| 1,829,133 | Frykman | Oct. 27, 1931 |
| 2,000,993 | Schmidt | May 14, 1935 |
| 2,070,518 | Smith | Feb. 9, 1937 |
| 2,190,709 | Friedstedt | Feb. 20, 1940 |

FOREIGN PATENTS

| Number | Country | Date |
|---|---|---|
| 573,150 | Germany | Mar. 28, 1933 |